United States Patent [19]

Hagino

[11] Patent Number: 5,119,179

[45] Date of Patent: Jun. 2, 1992

[54] VIDEO SIGNAL PROCESSING CIRCUIT FOR EXTRACTING A CHROMA SIGNAL FROM A LUMINOUS SIGNAL

[75] Inventor: Hideyuki Hagino, Fukaya, Japan

[73] Assignee: Kabushiki Kaisha Toshiba, Kawasaki, Japan

[21] Appl. No.: 582,078

[22] Filed: Sep. 14, 1990

[30] Foreign Application Priority Data

Sep. 19, 1989 [JP] Japan .................................. 1-240760

[51] Int. Cl.$^5$ .............................................. H04N 9/78
[52] U.S. Cl. ...................................... 358/31; 358/329; 358/36
[58] Field of Search ................... 358/31, 36, 328, 329, 358/330

[56] References Cited

U.S. PATENT DOCUMENTS

| | | | |
|---|---|---|---|
| 4,766,486 | 8/1988 | Ozaki | 358/329 |
| 4,771,341 | 9/1988 | Shimizu et al. | 358/329 |
| 4,831,463 | 5/1989 | Faroudja | 358/31 |

Primary Examiner—Victor R. Kosak
Attorney, Agent, or Firm—Finnegan, Henderson, Farabow, Garrett and Dunner

[57] ABSTRACT

A video signal processing circuit for reproducing an FM video signal. A video reproduction signal output from a magnetic head is supplied to a low-pass filter, which extracts a chroma signal. The video reproduction signal is also supplied to a chroma signal removing circuit through a high-pass filter of low degree and sharpness. The chroma signal removing circuit removes the chroma signal component. The output of the chroma signal removing circuit is amplitude-limited to a predetermined degree by a limiter, and then supplied to a demodulator which extracts a luminance signal.

3 Claims, 3 Drawing Sheets

VIDEO SIGNAL PROCESSING CIRCUIT FOR EXTRACTING A CHROMA SIGNAL FROM A LUMINOUS SIGNAL

BACKGROUND OF THE INVENTION

1. Field of the Invention

This invention relates to a circuit for use in a video tape recorder or the like, and more particularly to a video signal processing circuit for reproducing an FM video signal.

2. Description of the Related Art

In a video tape recorder (hereinafter abbreviated to as VTR), an FM luminance signal and a low-pass filtered chroma signal are recorded on magnetic tape. As shown in FIG. 1, in the FM converted luminance signal (Y), the syncchip carrier and the white peak have frequencies of 3.4 MHz and 4.4 MHz, respectively. The frequency of the low-pass filtered chroma signal (C) is 625 KHz. Thus, the FM luminance signal and the low-pass filtered chroma signal have different frequency bands. In general, filters are used to separate and extract the above-mentioned signal components from the video signal obtained by playing back the magnetic tape. More specifically, a low-pass filter (LPF) extracts a chroma signal component, and a high-pass filter (HPF) extracts a luminance signal component.

FIG. 2 is a circuit diagram showing the conventional video signal processing circuit for separating and extracting those signal components from the FM video reproduction signal. The signal reproduced by magnetic head 11 is amplified by preamplifier 12. The output of preamplifier 12 is supplied to LPF 13, in which a chroma signal (C) is extracted from the video reproduction signal. The output of preamplifier 12 is also supplied through FM-AGC (FM-automatic gain control) circuit 14 to HPF (high pass filter) 15. The output of HPF 15 is amplitude-limited to a predetermined degree by limiter 16, and the then supplied to demodulator 17, in which the luminance signal (Y) is extracted.

In the conventional video signal processing circuit, HPF 15 must be of high degree and sharpness (Q) to obtain sufficient separation characteristics. Since a filter circuit of high degree and sharpness requires a large number of elements and is therefore expensive, the cost of manufacturing the circuit is high. Moreover, a large phase shift may occur in such a filter circuit, and it is difficult to compensate for the phase shift. Further, when a filter circuit of a high sharpness is used as a HPF, since the low-pass component is removed from the FM signal, a high-pass component is excluded from the demodulated luminance signal, resulting in an image having poor frequency characteristics (low shade gradient).

On the other hand, when a filter circuit with a low degree and sharpness is used as HPF 15, a low-pass converted chroma signal component is regarded as a lower band wave of the FM signal, and included in a luminance signal component.

SUMMARY OF THE INVENTION

The present invention has been made in consideration of the above-described circumstances, and its object is to provide a video signal processing circuit in which a high-pass component is maintained in the demodulated luminance signal, and a chroma signal component is excluded from the luminance signal component.

According to the present invention, there is provided a video signal processing circuit comprising a low-pass filter for extracting a chroma signal component from a video reproduction signal, including the chroma signal component and a luminance signal component, a high-pass filter supplied with the video reproduction signal, and a chroma signal component removing circuit for extracting a chroma signal component from an output of the high-pass filter and for removing the chroma signal component from an output of the high-pass filter.

Additional objects and advantages of the invention will be set forth in the description which follows, and in part will be obvious from the description, or may be learned by practice of the invention. The objects and advantages of the invention may be realized and obtained by mean of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
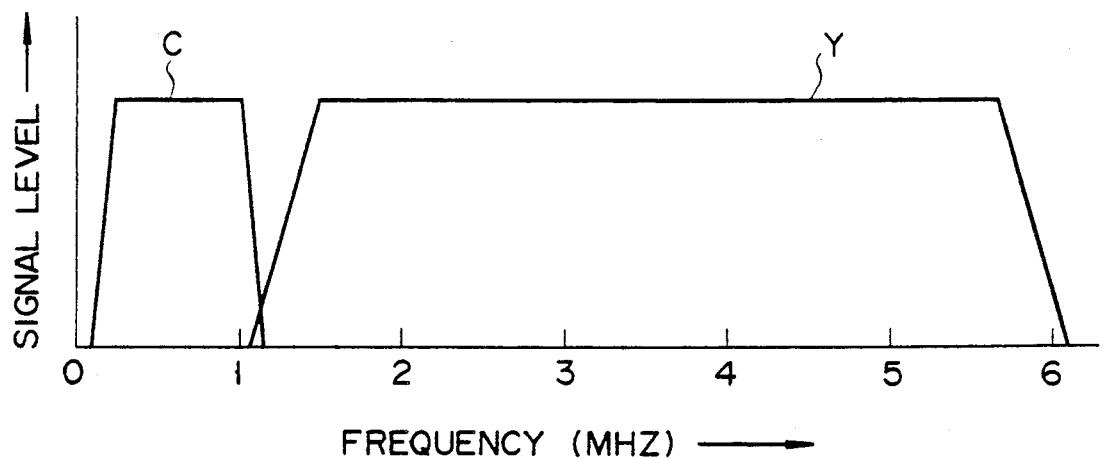
FIG. 1 is a diagram showing a frequency distribution state of an FM video reproduction signal.
Figure 2:
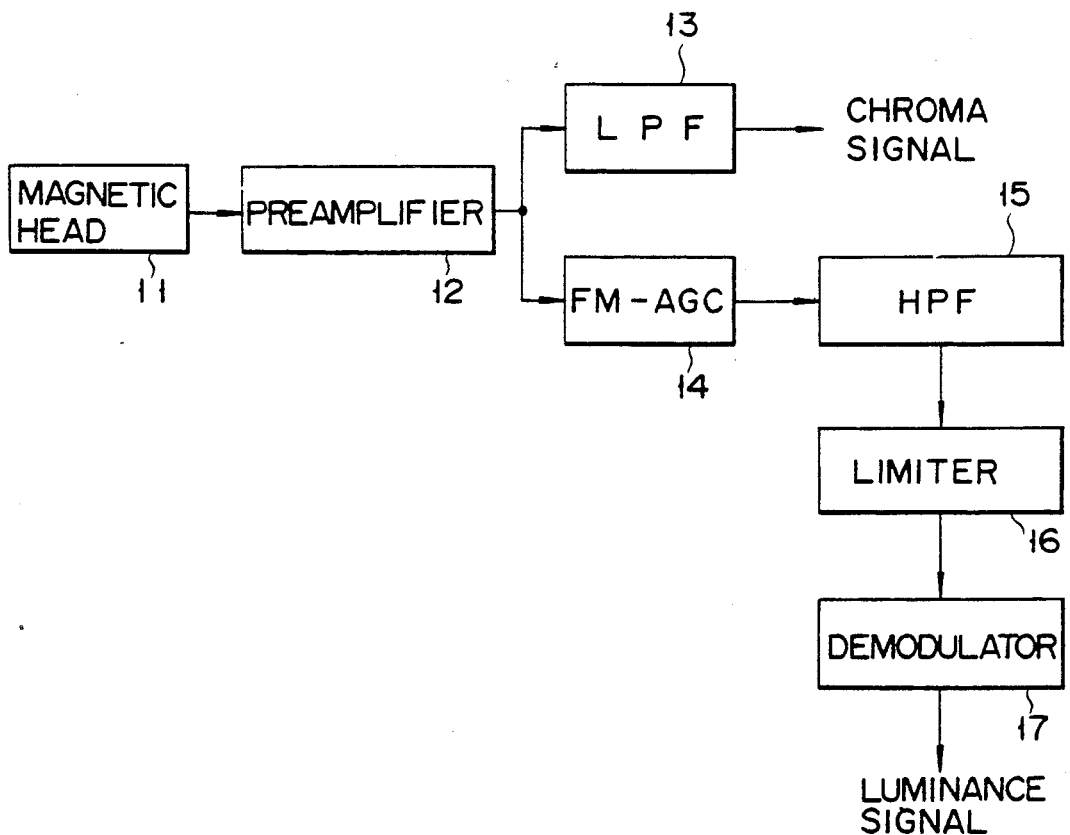
FIG. 2 is a circuit diagram showing a conventional video signal processing circuit.
Figure 3:
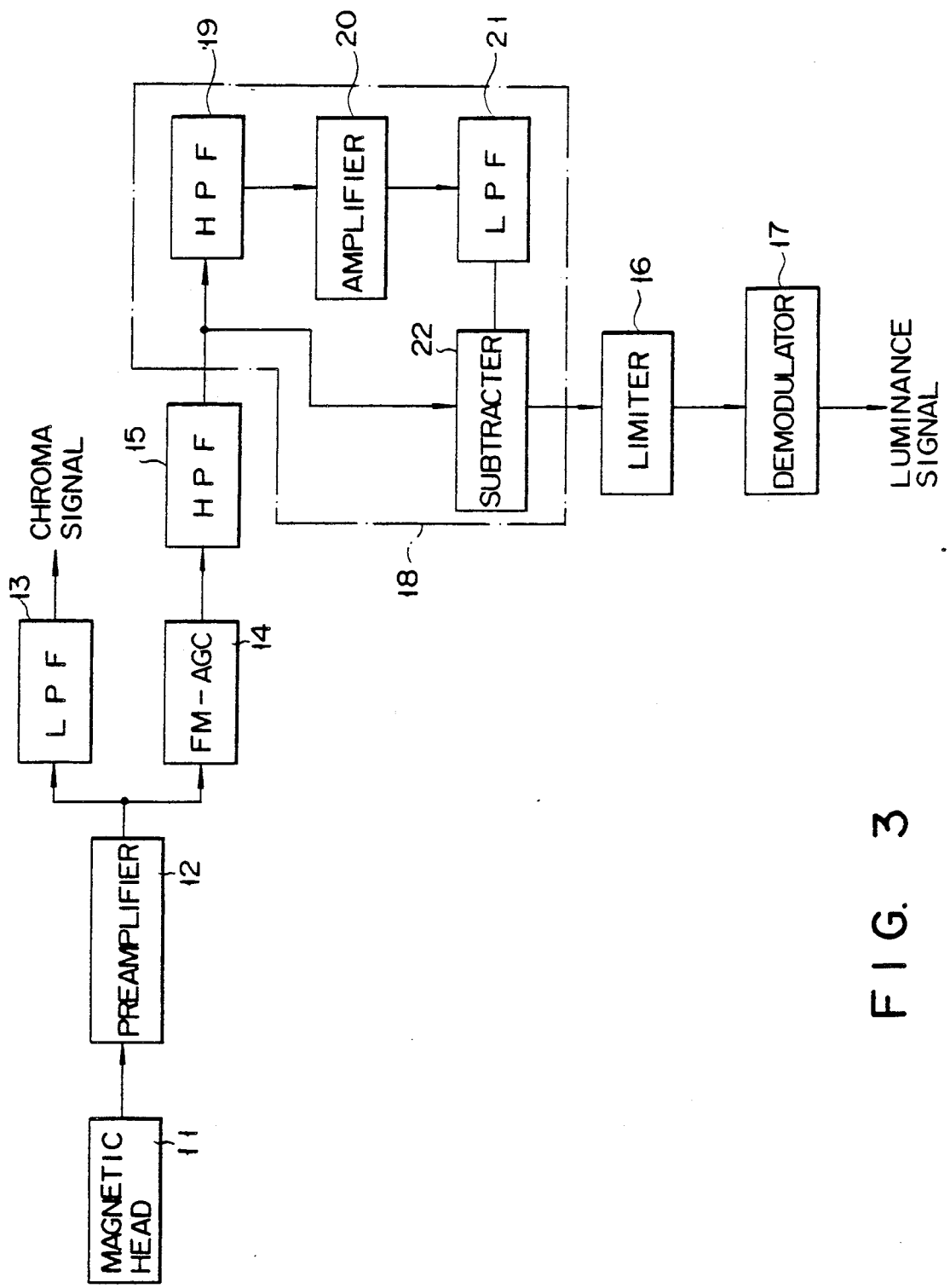
FIG. 3 is a circuit diagram showing a video signal processing circuit according to an embodiment of the present invention.

As shown in FIG. 3, a video reproduction signal, output from magnetic head 11, is amplified by preamplifier 12. An output of preamplifier 12 is input to LPF 13, which extracts a chroma signal component. An output of preamplifier 12 is also input through FM-AGC (FM-automatic gain control) circuit 14 to HPF 15. HPF 15 is of a low degree and sharpness (Q). Hence, HPF 15 outputs a reproduced FM signal including chroma signal components having frequencies around 629 KHz. The output of HPF 15 is supplied to chroma signal removing circuit 18. Chroma signal removing circuit 18 includes HPF 19 which receives the output of HPF 15, amplifier 20 which receives the output of HPF 19, LPF 21 which receives the output of amplifier 20, and subtracter 22 for subtracting the output of LPF 21 from the output of HPF 15.

In chroma signal removing circuit 18, HPF 19 removes signal components of the frequencies lower than that of the chroma signal component from the output of HPF 15. The output of HPF 19 is supplied to amplifier 20 which adjusts the amplitude of the chroma signal component appropriately. LPF 21 removes signal components of the frequencies higher than that of the chroma signal component from the output of amplifier 20. Hence, LPF 21 outputs only the chroma signal component of the frequency around 629 KHz. Subtracter 22 subtracts the output of LPF 21 from the output of HPF 15 and outputs a signal excluding the chroma signal component but including the low-pass component of the FM signal. The output of chroma signal removing circuit 18 is amplitude-limited by limiter 16 and supplied to demodulator 17, in which a luminance signal is extracted.

In the above embodiment, although two high-pass filters, HPFs 15 and 19 are used, both filters can be of low degree and sharpness. Hence, an increase in cost is prevented. In addition, since HPF 15 has low degree and sharpness, the phase shift is rarely made and can be compensated easily. Further, since a high-pass component is maintained in the demodulated luminance signal, an image of high frequency characteristics, in which shade gradient is great, can be obtained.

Figure 4:
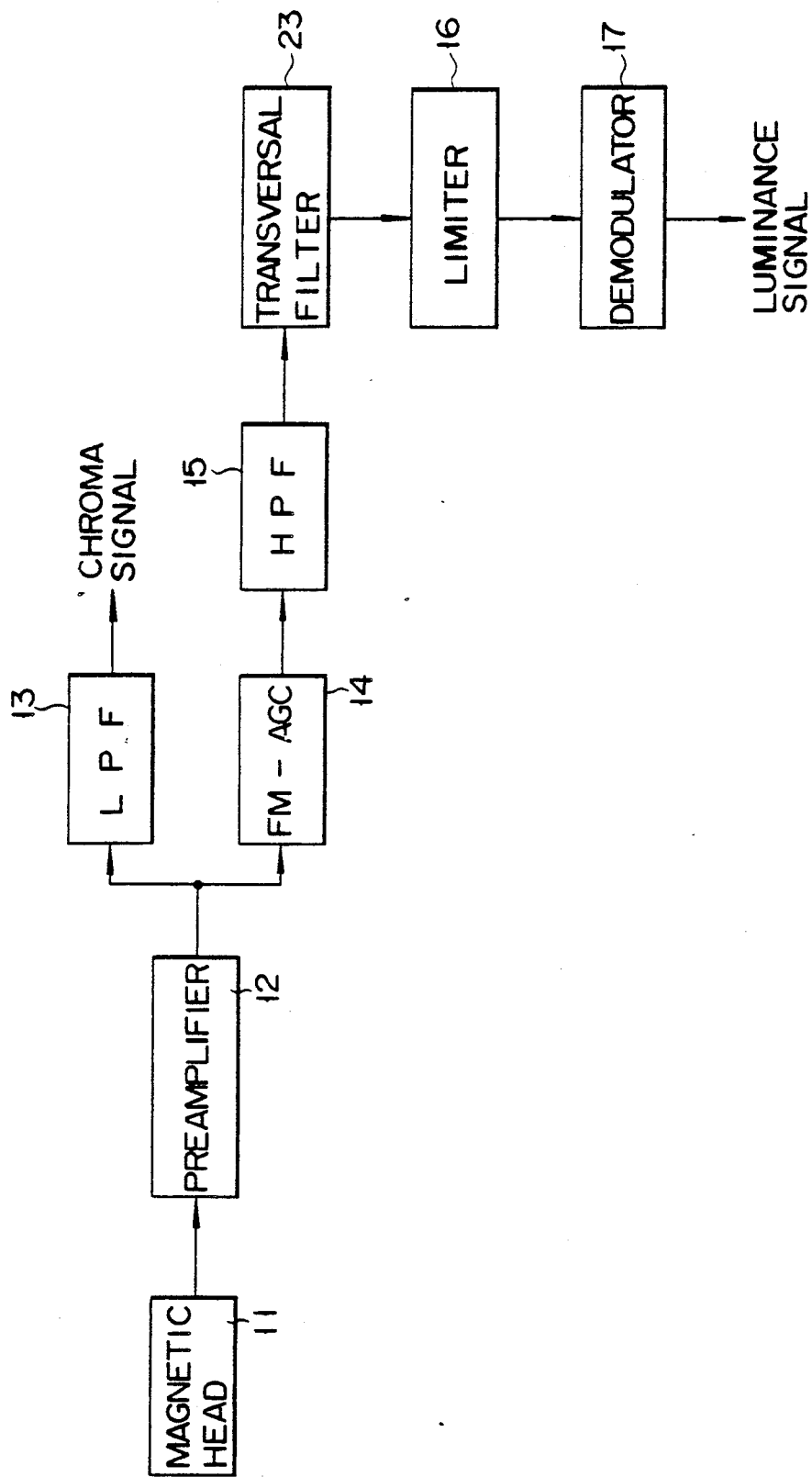
FIG. 4 is a circuit diagram showing a video signal processing circuit according to another embodiment of the present invention.

The present invention is not limited to the above-described embodiment. For example, according to the above embodiment, the output of HPF 15 is supplied to HPF 19; however, the output of FM-AGC circuit may be supplied to HPF 19. Also, according to the above embodiment, the signal processing circuit comprises a chroma signal removing circuit including an HPF, an amplifier, an LPF, and a subtracter as shown in FIG. 3; however, as shown in FIG. 4 which illustrates another embodiment of the present invention, the chroma signal removing circuit may be replaced by transversal filter 23 which is constructed to remove the chroma signal component having a frequency of around 629 KHz from the output of HPF 15.

As has been described above, according to the image signal processing circuit of the present invention, a high-pass component is maintained in the demodulated luminance signal, and a chroma signal component is removed from the luminance signal component.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A video signal processing circuit comprising:
   a first low-pass filter for extracting a chroma signal component from a video reproduction signal, the video reproduction signal including the chroma signal component and a luminance signal component;
   a first high-pass filter supplied with the video reproduction signal and outputting an output signal; and
   a chroma signal component removing circuit for extracting the chroma signal component from the output signal of the first high-pass filter and for removing the chroma signal component from the output signal of the first high-pass filter, said chroma signal component removing circuit comprising:
   a second high-pass filter for receiving the output signal of said first high-pass filter and for outputting an output signal;
   an amplifier for receiving the output signal of said second high-pass filter and for outputting an amplified output signal;
   a second low-pass filter receiving the amplified output signal and for outputting an output signal; and
   a subtractor for subtracting the output signal of said second low-pass filter from the output signal of said first high-pass filter and for outoutting a subtraction signal.

2. A video signal processing circuit according to claim 1, further comprising a demodulator for receiving the subtraction signal of said subtractor and for reproducing the luminance signal component.

3. A video signal processing circuit comprising:
   a low-pass filter for extracting a chroma signal component from a video reproduction signal, the video reproduction signal including the chroma signal component and a luminance signal component;
   a high-pass filter supplied with the video reproduction signal and outputting an output signal;
   a transversal filter for extracting the chroma signal component from the output signal of said high-pass filter and for outputting an output signal; and
   a demodulator for receiving the output signal of said transversal filter and for reproducing the luminance signal component.

* * * * *

UNITED STATES PATENT AND TRADEMARK OFFICE
CERTIFICATE OF CORRECTION

PATENT NO. : 5,119,179
DATED : June 02, 1992
INVENTOR(S) : Hideyuki Hagino

It is certified that error appears in the above-identified patent and that said Letters Patent is hereby corrected as shown below:

Claim 1, column 4, line 25, change "outoutting" to --outputting--.

Signed and Sealed this

Ninth Day of November, 1993

Attest:

BRUCE LEHMAN

*Attesting Officer*        Commissioner of Patents and Trademarks